(12) United States Patent
Neuhaeusser

(10) Patent No.: US 12,711,350 B2
(45) Date of Patent: Aug. 18, 2026

(54) SYSTEM AND METHOD FOR IMPROVING ENGINEER-TO-ORDER CONFIGURATION

(71) Applicant: Siemens Industry Software Inc., Plano, TX (US)

(72) Inventor: Martin Richard Neuhaeusser, Nuremberg (DE)

(73) Assignee: Siemens Industry Software Inc., Plano, TX (US)

( * ) Notice: Subject to any disclaimer, the term of this patent is extended or adjusted under 35 U.S.C. 154(b) by 1081 days.

(21) Appl. No.: 17/786,041

(22) PCT Filed: Dec. 16, 2019

(86) PCT No.: PCT/EP2019/085278

§ 371 (c)(1),
(2) Date: Jun. 16, 2022

(87) PCT Pub. No.: WO2021/121539

PCT Pub. Date: Jun. 24, 2021

(65) Prior Publication Data

US 2023/0029418 A1 Jan. 26, 2023

(51) Int. Cl.
*G06N 3/02* (2006.01)
*G06Q 10/04* (2023.01)
*G06Q 10/063* (2023.01)

(52) U.S. Cl.
CPC ............... *G06N 3/02* (2013.01); *G06Q 10/04* (2013.01); *G06Q 10/043* (2013.01); *G06Q 10/063* (2013.01)

(58) Field of Classification Search
CPC ......... G06N 3/02–0499; G06Q 30/0603–0631
(Continued)

(56) References Cited

U.S. PATENT DOCUMENTS 5,799,293 A * 8/1998 Kaepp ..................... G06F 30/00 706/45
5,991,528 A * 11/1999 Taylor ............. G05B 19/41865 700/95
(Continued)

FOREIGN PATENT DOCUMENTS

| | | |
|---|---|---|
| CN | 1758256 A | 4/2006 |
| EP | 2869257 A1 | 5/2015 |

(Continued)

OTHER PUBLICATIONS

Meireles, Magali RG, Paulo EM Almeida, and Marcelo Godoy Simões. "A comprehensive review for industrial applicability of artificial neural networks." IEEE transactions on industrial electronics 50.3 (2003): 585-601. (Year: 2003).*
(Continued)

*Primary Examiner* — James Trujillo
(74) *Attorney, Agent, or Firm* — Laurence A. Greenberg; Werner H. Stemer; Ralph E. Locher

(57) ABSTRACT

A method for determining a set of output configuration values characterizing a specific configuration of a complex product, includes receiving a set of input configuration parameters, providing at least a part of the input configuration parameters as an input to a solver, using the solver to calculate at least one output value from the provided input configuration parameters, and determining the set of output configuration values from at least the output value calculated by the solver. The solver is configured for solving a first order logic function encoding an algorithm of a trained deep neural network or DNN, wherein the algorithm of the DNN has been trained for modeling a function of an external configuration tool or ECT that is required for determining the specific configuration of the complex product. A system
(Continued)

for determining the set of output configuration values, and a training system, are also provided.

8 Claims, 3 Drawing Sheets

(58) Field of Classification Search
USPC .............................................. 706/19, 45–48
See application file for complete search history.

(56) References Cited

U.S. PATENT DOCUMENTS

| | | | | |
|---|---|---|---|---|
| 7,664,720 | B1 | 2/2010 | Freeman et al. | |
| 11,521,069 | B2 * | 12/2022 | Wick | G06N 5/01 |
| 11,551,096 | B1 * | 1/2023 | Mishra | G06N 3/092 |
| 2007/0094175 | A1 * | 4/2007 | Axling | G06F 30/00 706/19 |
| 2008/0133442 | A1 * | 6/2008 | Fischer | G06Q 50/04 706/47 |
| 2010/0161289 | A1 | 6/2010 | Stojanovic et al. | |
| 2014/0032472 | A1 * | 1/2014 | Kaledhonkar | G06N 5/025 706/48 |
| 2019/0228098 | A1 * | 7/2019 | Daly | G06N 3/042 |
| 2020/0242279 | A1 * | 7/2020 | Malkosh | G06Q 30/0621 |

FOREIGN PATENT DOCUMENTS

| | | | | |
|---|---|---|---|---|
| EP | 2996076 | A1 | 3/2016 | |
| EP | 3667567 | A1 * | 6/2020 | G06F 17/16 |
| GB | 2474900 | A | 5/2011 | |
| KR | 20140094345 | A | 7/2014 | |
| WO | 2019043425 | A1 | 3/2019 | |

OTHER PUBLICATIONS

Yue Wang, Daniel Y. Mo, Mitchell M. Tseng. “Mapping customer needs to design parameters in the front end of product design by applying deep learning” CIRP Annals - Manufacturing Technology 67 (2018) 145-148. Available online Apr. 26, 2018. (Year: 2018).*

Park et al. “Artificial intelligence approaches to determination of CNC machining parameters in manufacturing: a review”, 1998, p. 127-134, vol. 12, Artificial Intelligence in Engineering, Elsevier Science Limited, Great Britain, XP093342320, ISSN: 0954-1810, DOI: 10.1016/S0954-1810(97)00011-3.

Anonymous, “What is the difference between a neural network and a deep neural network, and why do the deep ones work better?”, 2015, p. 1-17, Cross Validated, XP093342320, https://stats.stackexchange.com/questions/182734/what-is-the-difference-between-a-neural-network-and-a-deep-neural-network-and-w.

* cited by examiner

300

SYSTEM AND METHOD FOR IMPROVING ENGINEER-TO-ORDER CONFIGURATION

FIELD AND BACKGROUND OF THE INVENTION

The present invention relates to engineer-to-order (ETO) configuration systems and methods.

ETO refers to the structured collection of all parameters that constitute a valid specification of a complex product. The complexity of the parameter dependencies distinguishes ETO from much simpler (mostly Boolean) product configuration.

Whereas in the latter, most rules are easily expressed in propositional logic, ETO configuration rules that govern the available parameter values often involve execution of external tools such as simulators, data-base lookups, or arbitrary code. Examples of products that are built according to an ETO configuration range from tubular heat exchangers over gas turbines, military and civil trucks to conveyor belt systems.

Today, it is standard for classical product configuration environments to allow a user to set the configuration options in arbitrary order. Specifically, the user might start to set the most important parameters for a specific use case while the tool for product configuration automatically determines the set of valid values for the remaining (and less important) parameters. Technically, the ability to specify parameters in arbitrary order or to let irrelevant parameters be deduced automatically according to some optimality criterion has become feasible due to recent progress in satisfiability checking (SAT).

However, these techniques do not transfer to ETO configuration: In all state-of-the-art ETO configuration tools, the user is guided through the configuration process in a step-by-step manner. In particular, the user is neither allowed to skip certain irrelevant configuration parameters, nor allowed to start the configuration process with the most important parameters first. Instead, the configuration tool enforces that all parameters are provided in a strictly predefined order, no matter if this order matches the user's priorities.

As example, one may consider an ETO configuration of a military truck. For a first user, the weight of the truck might be irrelevant, while the strength of the armor is crucial. Therefore, said first user needs to specify the armor strength first and expects the configuration tool to restrict other parameter values that can be chosen in the remaining configuration workflow (e.g. maximum speed, engine power, space) to be in accordance with the specified armor strength. For a second user, weight might be crucial, as the truck is for instance intended to be transported by aircraft. Naturally, the second user needs to provide a maximum weight first, i.e. as initial condition, and expects the configuration tool to check that the remaining choices for parameter values do not violate the initial condition on the truck's admissible weight.

While such an order-less configuration is available in most state-of-the-art Boolean configurators, it is not supported by any of today's ETO configuration systems. For instance, if r $(x_1, X_2, \ldots, X_n, y_1, y_2, \ldots, y_m)$ is an ETO rule whose validity is determined by an external tool T (e.g. a simulation run) which expects input parameters $x_1, \ldots, x_n$ and provides output values $y_1, \ldots, y_m$. The fact that T hides the relationship between its inputs and outputs makes any rule r that relies on T unsuitable for order-less configuration:

Imagine a user has specified some condition C that involves $y_k$. Any tool that supports order-less configuration must deduce the set of inputs $\{(x_1, \ldots, x_n) | T(x_1, \ldots, x_n)=(y_1, \ldots, y_m) \wedge C(y_k)=\text{true}\}$. However, the mapping that is implemented by T remains opaque and T generally does not allow to reason backwards. Consequently, there is no way to easily deduce the set of inputs S for a specific output by executing T.

Some attempts to solve the problem related to ETO configuration have been made to extend the methodology used in Boolean configurators to ETO. However, these techniques are too limited to be practical, because they fail completely if the validation of some rules requires a call to an external simulator that depends on more than two to three discrete parameters. Validation of any such rule involves at least one call of an external solver (e.g. a Finite Element Method (FEM) solver). In general, many such calls are necessary to determine the admissible combinations of remaining configuration options that respect the user's prior choices (which might take hours). Each rule of an ETO system that executes code or an external tool during validation is evaluated many times each time the user sets a parameter. In practice, the combinatorial explosion requires the external tool to be invoked thousands of times whenever the user makes a single selection. This does not scale and is impractical already due to the massive amount of computation time consumed for each configuration step.

SUMMARY OF THE INVENTION

An objective of the present invention is to propose an ETO configuration system and a method that enable a user to freely choose the order in which parameters in a complex ETO configuration task are set, while decreasing the time required for achieving the configuration process, making therefore the ETO configuration process for complex products more efficient compared to existing techniques.

This objective is achieved according to the present invention by an ETO configuration method and system for efficiently determining, from a set of input parameters, a set of output parameters characterizing a complex product according to the object of the independent claims. Dependent claims present further advantages of the invention.

The present invention concerns an ETO configuration method for automatically determining a set of output configuration values from a set of input configuration parameters, wherein said set of output configuration values is configured for defining a specific configuration of a complex product that satisfies in particular predefined requirements or constraints, wherein the determination of said specific configuration involves an external configuration tool (hereafter ECT) configured for providing an ECT output value (or several ECT output values) from one or several ECT input parameters. The products considered by the present invention are typically complex products, i.e. whose configuration requires an invocation/call of an ECT. Complex products according to the present invention refers therefore to any product for which solving the product configuration problem involves evaluating dependencies with ECTs (e.g. simulators, ODE solvers, databases, numerical computations, solving of differential equations, etc.). In this field of complex product configuration determination, the method according to the invention comprises:

- receiving a set of input configuration parameters, e.g. via a first interface, wherein the input configuration parameters comprised within said set are configured for specifying features, preferentially all features, needed for determining said specific configuration of the product (in other words, said set of input configuration parameters comprises some or all parameters needed for configuring the product, i.e. needed for determining said specific configuration of the product. In particular, different input configuration parameters of said set might be received temporally at different times during the configuration: for instance, a subset $S_{T1}$ is received at time T1 and comprises input configuration parameters provided by a user and optionally by the system according to the invention, and another subset, e.g. $S_{T2}$, might be received at time T2 taking place after T1 and optionally after running a solver or executing a configuration rule according to the invention, wherein said another subset may comprise input configuration parameters provided after the time T1 by the user and/or one or several solver output values obtained from one or several input configuration parameters of $S_{T1}$, and/or one or several parameters obtained by executing the configuration rule after said time T1). Preferentially, said set of input configuration parameters comprises a first subset and a second subset, wherein the first subset comprises one or several input parameters whose values are provided by a user and the second subset comprises one or several input parameters whose values are automatically determined/selected by the system. Typically, the first subset comprises input parameters whose values are defined as requirements for the specific configuration, while the second subset comprises input parameters whose values are unspecified for said specific configuration and which might be automatically determined or selected by the system according to the invention, being for instance predefined in function of a type of material, or product structure, etc.;

providing at least a part of the set of input configuration parameters as input to a solver, typically an SMT solver, configured for solving a first order logic function encoding an algorithm of a trained deep neural network (DNN), wherein the DNN has been trained for approximating a function of the ECT that is required for determining said specific configuration, the solver being configured for providing as output, from said part of the set of input configuration parameters, a set of output values (comprising one or several output values) involved in the determination of said output configuration values. The one or several output values outputted by the solver are approximations of one or several output values that would be obtained by running said ECT while using as input said part of the set of input configuration parameters. Indeed, the DNN according to the invention is configured for approximating the ECT in that output values obtained by both the ECT and the DNN when using the same input parameters are close enough so that their difference satisfies predefined requirements (e.g. the difference is below 5%). Preferentially, the DNN according to the invention comprises a rectified linear unit as activation function, making it possible to approximate the input-output relation of the ECT by a mapping from an input vector $(x_1, \ldots, x_n)$ towards an output vector $(y_1, \ldots, y_m)$ wherein said mapping is a piecewise linear function $f: \mathbb{R}^n \rightarrow \mathbb{R}^m$. The present invention proposes then to encode such piecewise linear function in a first order logic and to use the solver to evaluate its output;

automatically generating said set of output values by means of the solver;

determining the set of output configuration values from the values outputted by the solver. For instance, the values outputted by the solver might be transmitted, e.g. automatically transmitted, to another solver involved in the determination of the specific configuration and used as input to said another solver, or might be already a part of the output configuration values comprised within said set of output configuration values, in the sense that they can be used as such by a manufacturing system for manufacturing the complex product;

optionally, the determined set of output configuration values are transmitted, e.g. automatically transmitted, to a manufacturing system for manufacturing, e.g. automatically manufacturing, the product, wherein a use, by means of the manufacturing system, of the output configuration values results in a manufacture of a complex product according to said specific configuration.

The present invention proposes also a system for automatically determining a set of output configuration values from a set of input configuration parameters, wherein said set of output configuration values is configured for defining a specific configuration of a complex product, said specific configuration satisfying for instance predefined requirements or constraints, the determination of the specific configuration of the complex product involving a call or invocation of at least one ECT, the system comprising:

a first interface for enabling an acquisition of the set of input configuration parameters;

a computation unit comprising a solver configured for automatically calculating a set of output values from at least a part of the set of input configuration parameters, wherein said solver is configured for solving a first order logic function encoding an algorithm of a trained deep neural network (DNN), wherein the algorithm of the DNN has been trained for modeling a function of the ECT that would be required for determining said specific configuration of the product, said function enabling for instance a simulation of product configurations from parameters received as input by the ECT, said function outputting output values for each simulated configuration of the product, wherein output values generated by the DNN from said parameters received as input by the ECT are approximations of the output values that would be generated by the ECT when simulating said specific configuration from said parameters received as input and by means of said function. The computation unit is further configured for determining the output configuration values from the set of output values calculated by the solver;

a second interface for providing the output configuration values determined by the computation unit;

optionally, a manufacturing system, for instance connected to said second interface, for preferentially automatically managing the manufacture of the product according to the previously determined output configuration values in order to produce a product according to said specific configuration.

Advantageously, the present invention proposes also a method and a system for training the DNN to approximate the ECT, the method comprising:

receiving sets of input parameters, wherein each set comprises all parameters needed by a function of the ECT for determining an associated set of one or several ECT output values required for a product configuration, i.e. involved in the determination of a specific product configuration of a complex product;

receiving for each set of input parameters said associated set of one or several ECT output values, wherein the associated set of ECT output values has been obtained by running the ECT using as input of the latter the set of input parameters to which it is associated;

training an algorithm of DNN approximating the external configuration tool, wherein said training is based on the sets of input parameters and the corresponding associated sets of ECT output values;

storing the trained DNN.

The previously described method might be carried out by a training system according to the invention, wherein said training system comprises:

a first training interface configured for acquiring sets of input parameters;

a second training interface configured for receiving for each set of input parameters an associated set of ECT output values from an execution of a function of an ECT;

a training computation unit configured for training a DNN based on each pair of sets comprising a set of input parameters and its associated set of ECT output values, wherein the training computation unit is configured for controlling an ECT, so that the latter provides for each set of input parameters the set of ECT output values, said set of ECT output values being collected by the training computation unit via said second training interface in order to train the DNN;

a memory configured for storing the trained DNN.

BRIEF DESCRIPTION OF THE FIGURES

Preferred but not exclusive embodiments of the invention will now be described with reference to the accompanying drawing, FIG. 1 schematically a preferred embodiment of a system according to the invention.

DETAILED DESCRIPTION OF THE INVENTION

Figure 1:
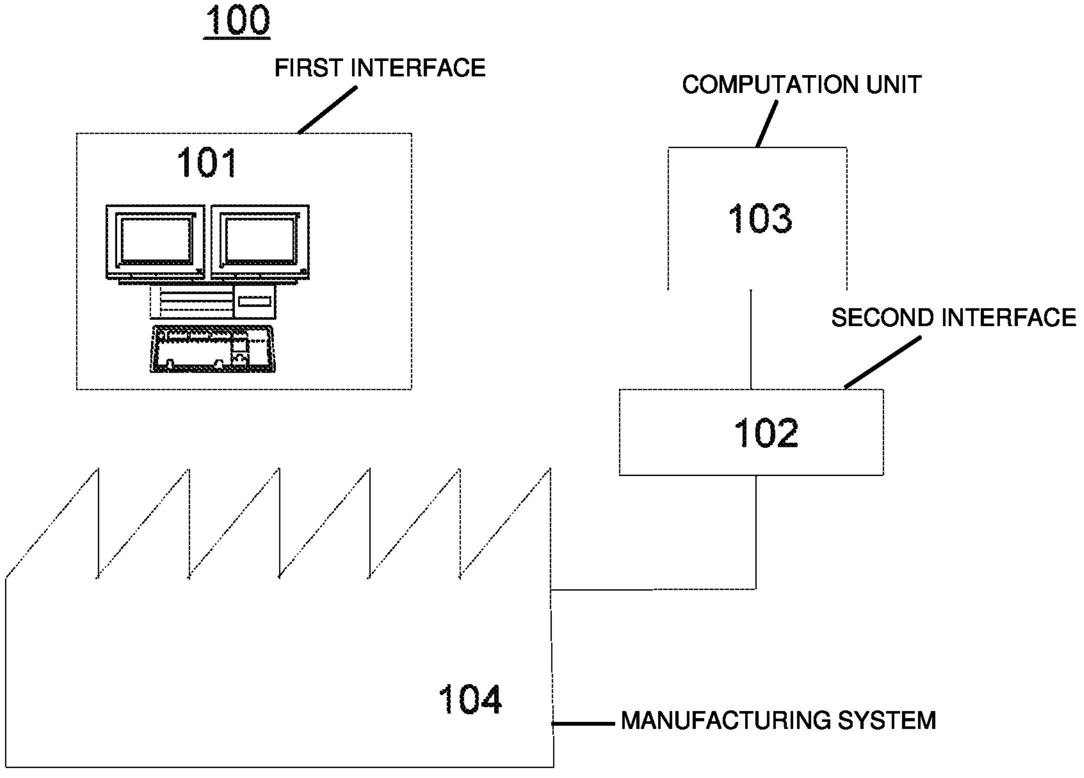

A preferred embodiment of a system 100 according to the invention is shown in FIG. 1. Said system 100 enables a user to easily and efficiently determine a specific configuration of a complex product from a set of input configuration parameters, wherein the configuration process, i.e. the process for determining output configuration values that are going to characterize the specific configuration of the product, while requiring an invocation of an ECT, is completely order-less for a user: the system does not oblige the user to define different aspects of a product according to a predetermined strict order (often unintuitive, and usual in prior art techniques as soon as an invocation of an ECT is required), but advantageously enables a user to freely select which aspects of the product he wants to configure first.

The system 100 according to the invention typically comprises a first interface 101, including for instance a user interface which may comprise a keyboard or a touchscreen. The first interface 101 enables the system 100 to acquire said set of input configuration parameters. For instance, the user may use the user interface for providing the system 100 with a subset of said set of input configuration parameters. Alternatively, or in addition, the first interface 101 might be connected to a database for automatically acquiring another subset of the input configuration parameters. Said input configuration parameters are for instance a desired length for a product, and/or a specific weight, and/or one or several materials to be used for said product, and/or material properties, and/or environmental conditions, and/or a specific geometry, etc.

Said input configuration parameters are then automatically provided to a computation unit 103 of the system 100. The computation unit 103 may comprise one or several processors and optionally one or several memories. The processing unit 103 is configured for automatically determining, from the received input configuration parameters, output configuration values that characterize the specific configuration of the complex product. The processing unit 103 might be connected to a second interface 102 and/or to a memory. For instance, the processing unit 103 might be configured for storing the output configuration values in said memory, and/or for automatically transmitting, via the second interface 102, the output configuration values to a control unit of a manufacturing system 104. The control unit is in particular configured for controlling a manufacture of a product according to the received output configuration values, the latter defining for instance the materials, and/or dimensions, and/or geometry, of the complex product so that it satisfies predefined requirements or constraints. The output configuration values comprise preferentially all necessary information for enabling the manufacturing system to technically manufacture a product according to said specific configuration.

The determination of the output configuration values by the computation unit 103 involves as initial step a first phase of data collection and a second phase comprising a training of a DNN. This initial step preferentially takes place offline, i.e. before starting a configuration process for a complex product. Indeed, the present invention proposes to execute a function T of the ECT required for processing at least some of the input configuration parameters in order to enable the computation unit 103 to determine the output configuration values before starting a configuration process, which typically takes place online, as soon as a user requires a new configuration for a complex product.

According to the present invention, the ECT is thus executed offline, before any call of the system according to the invention by a user, and on large sets of input parameters, wherein each set comprises the input parameters required for executing said function T of the ECT that is required for determining the specific configuration of the complex product. For each set of input parameters provided to the ECT, a training system according to the invention is configured for providing to the ECT the set of input parameters, executing the running of the function T of the ECT that is required for determining the specific configuration of the complex product, and collecting, via a second interface, a set of ECT output values associated to the set of input parameters provided to the ECT. In other words, during the phase of data collection implemented by the training system according to the invention, the ECT calculates via its function T for each set of input parameters an associated set of ECT output values, the latter being automatically collected by the training system according to the invention and stored in a memory.

This data collection phase is time consuming and needs to be done for each ECT that will be required during the configuration process of the complex product. However, it only has to be done once and it can be preferentially parallelized without any loss up to an arbitrary degree, by letting for instance each ECT execute in parallel on a cloud platform on millions of different sets of input parameters.

Once the data collection phase is finished or in parallel to the latter as soon as a set of ECT output values is available, the training system according to the invention starts the training of a DNN: pairs of data comprising a set of input parameters ($x_1, \ldots, x_n$) and an associated set of ECT output values ($y_1, \ldots, y_m$) are used by the training system for teaching an algorithm A of the DNN. At the end of the training, the trained algorithm A is able to approximate ECT output values of the function T: $T(x_1, \ldots, x_n)=(y_1, \ldots, y_m)$.

Figure 3:
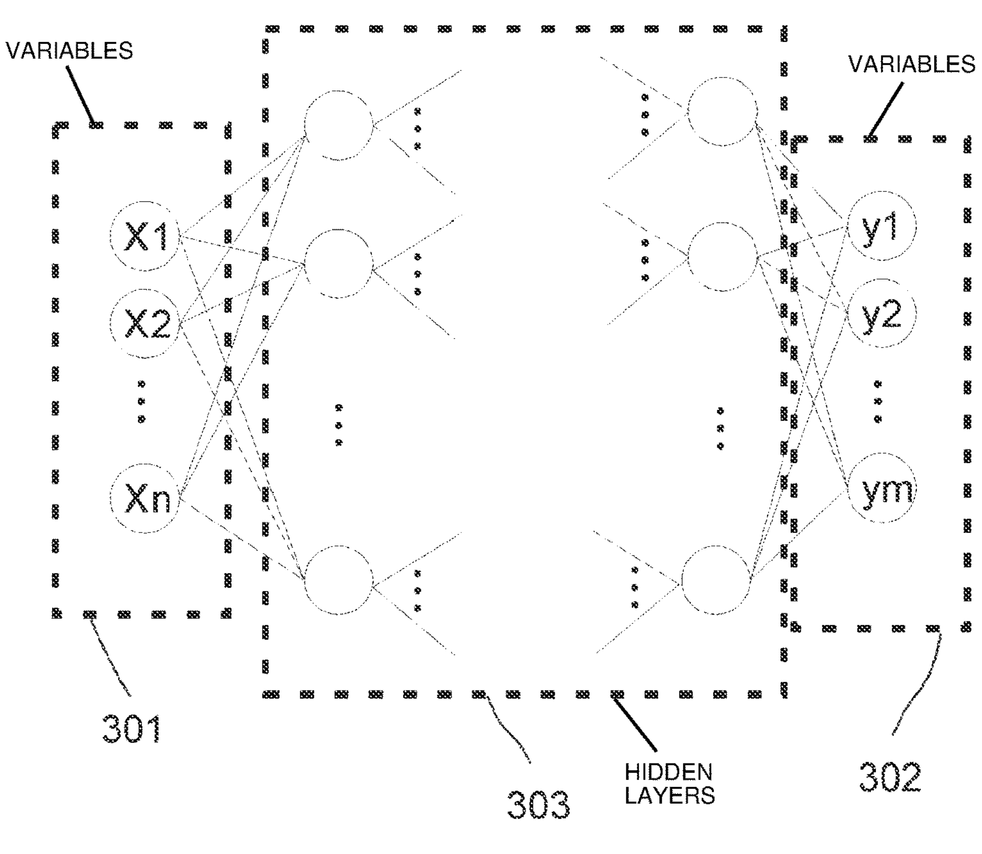
FIG. 3 an example of a DNN according to the invention.

Advantageously, since the function T of the ECT is not available to the system according to the invention (the ECT being a very complex external tool with respect to the system according to the invention), the trained algorithm enables to simulate the behavior of the function T without having to run said function in a trial-and-error fashion thousands of times. Another advantage is that the DNN has a well-defined inner structure that is accessible to automated reasoning. In particular, the DNN according to the invention comprises a rectified linear unit as activation function that is configured for formally describing an approximation of how the function T maps inputs ($x_1, \ldots, x_n$), to ECT outputs ($y_1, \ldots, y_m$). By construction, as shown in FIG. 3, the input neurons of the DNN constitute the variables $x_1, \ldots, x_n$, 301 and its output layer consists of the variables $y_1, \ldots, y_m$, 302 and the weights and biases that constitute its hidden layers 303 provide the approximation of the function T obtained by training the algorithm of the DNN.

Therefore, instead of executing the function T thousands of times during an ETO configuration to determine the dependencies between ($x_1, \ldots, x_n$), and ($y_1, \ldots, y_m$) that are required in order to determine the specific configuration of a product, the system according to the invention uses a DNN for approximating the function T. Compared to the ECT, the DNN might be executed nearly instantaneously, i.e. orders of magnitude faster than a call to the function T.

Figure 4:
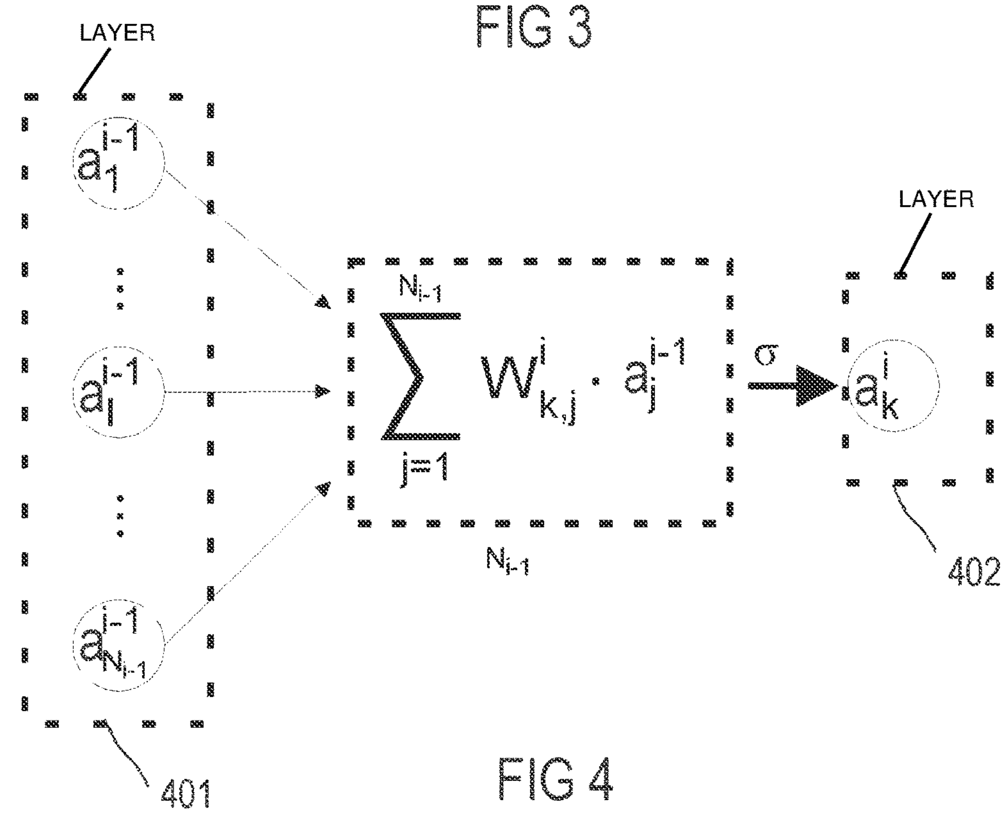
FIG. 4 an example of a preferred DNN according to the invention.

A further advantage of the DNN according to the invention is presented in connection with FIG. 4, wherein the relation between the layer i-1 401 and the layer i 402 is presented: the DNN according to the invention enables an approximation of the mapping $(x_1, \ldots, x_n) \mapsto (y_1, \ldots, y_m)$ implemented by the function T in a way that is readily accessible to solver technology. Indeed, by considering the k-th neuron in layer i, its value $$a_k^i$$

is determined by the sum of layer (i-1)'s neurons, weighted by layer i's weight matrix $W^i \in R^{Ni \times Ni-1}$, and its activation function σ. Formally, $$a_k^i = \sigma\left(\sum_{j=1}^{N_{i-1}} W_{k,j}^i \cdot a_j^{i-1}\right).$$

According to the present invention, σ is preferentially a rectified linear unit, i.e. σ(x)=max(x, 0). Consequently, and advantageously, the value of each neuron $$a_k^i$$

in the DNN is determined by a piecewise linear combination of its inputs, and thus by a piecewise linear function which makes the DNN with the rectified linear unit as activation function accessible to satisfiability solvers. Indeed, such a function can straightforwardly be encoded in first order logic and fed to a decision procedure of a solver according to the invention.

Advantageously, the use of a solver for evaluating the first order logic function encoding the piecewise linear function of the DNN approximating the function T of the ECT enables to reason about the mapping $(x_1, \ldots, x_n) \mapsto (y_1, \ldots, y_m)$ in arbitrary order. In particular, given a formalization of the piecewise linear function *f* in first order logic, a rule r ($x_1, \ldots, x_n, y_1, \ldots, y_m$) can automatically be evaluated by a satisfiability solver without the need of ever executing the function T of the ECT. Moreover, evaluation is directionless, i.e. the solver can propagate constraints on ($x_1, \ldots, x_n$) to constraints about ($y_1, \ldots, y_m$) as well as the other way around. This advantageously enables a completely order-less ETO configuration, providing a great advantage over the existing prior art techniques.

Figure 2:
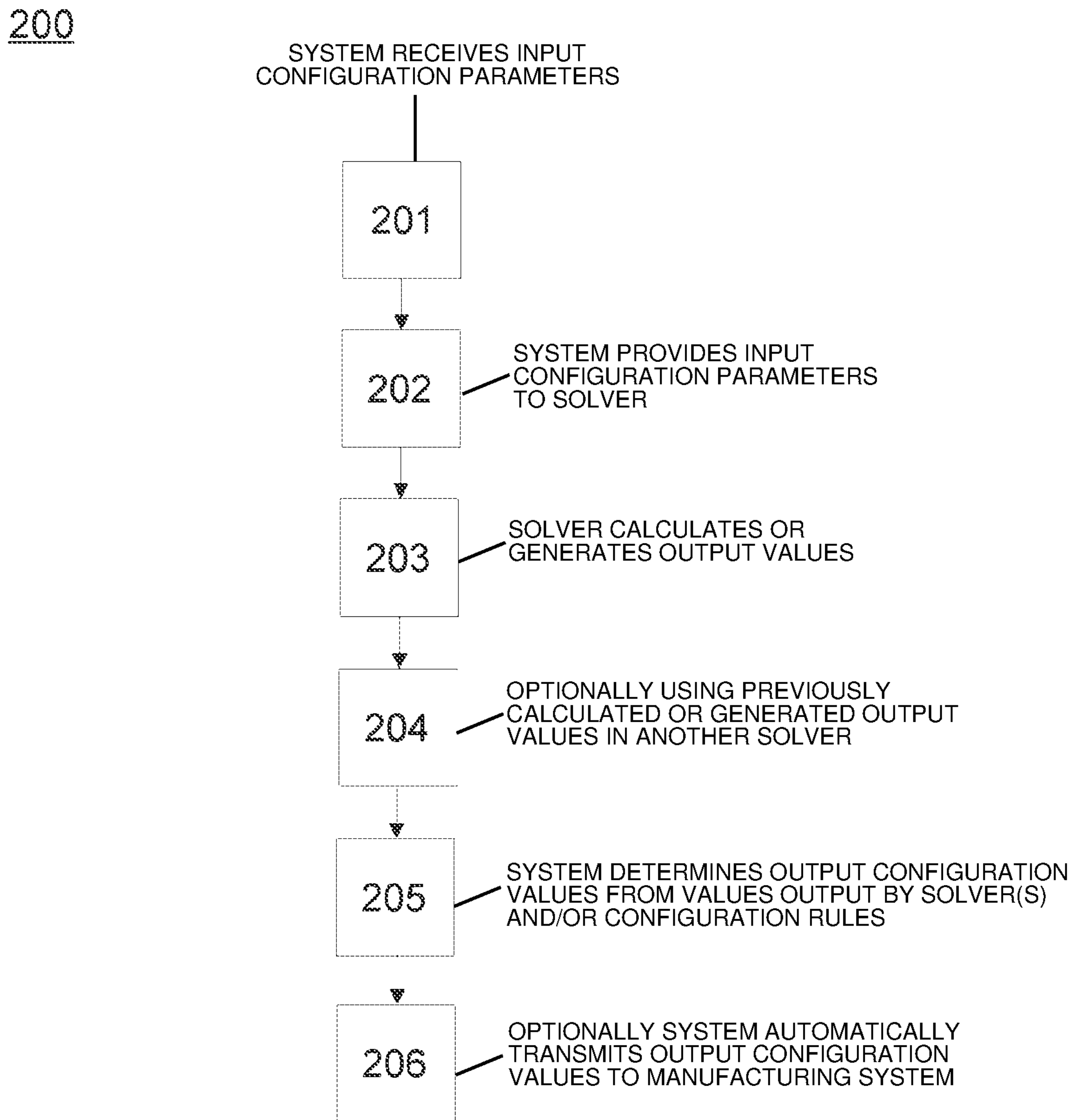
FIG. 2 schematically a flowchart representing a method according to the invention.

FIG. 2 presents a flowchart 200 schematically illustrating the steps of the method according to the invention, which can be carried out by the system 100 previously described. The steps of FIG. 2 take place after the initial step comprising said first phase of data collection and said second phase of DNN training.

At step 201, the system 100 receives a set of input configuration parameters. For instance, a user may provide via a first interface 101 input configuration parameters that are required for determining a specific configuration of a product. Advantageously, the system 100 is also able to receive as "input" one or several output configuration values that have to be reached or satisfied by the product once its configuration is achieved (in other words, the system 100 enables a user to provide a value for $y_i$ and can automatically determine constraints or requirements on the input configuration parameters from the value for $y_i$). Other input configuration parameters might be automatically determined by the system 100, for instance from a database. Input configuration parameters might be received by the system, optionally requested from a user, at different times during the process of determining the specific configuration of the complex product.

At step 202, the system is configured for providing a part of, or all, the input configuration parameters as input to a solver. Said solver, as previously explained, is configured for solving a first order logic function encoding an algorithm of a DNN, wherein the DNN has been trained for approximating a function T of the ECT.

At step 203, said solver calculate or generate output values from the input configuration parameters it received as input.

At step 204 and optionally, part or all previously calculated or generated output values are used as input in another solver configured for solving another first order logic function encoding an algorithm of another DNN, wherein said another DNN has been trained for approximating another function T' of the ECT or of another ECT. Alternatively, or in addition, part or all previously calculated or generated output values are used by the system as input for an execution of a configuration rule. As described in step 203, said another solver calculate or generate output values from the input configuration parameters it received as input. Similarly, the execution of the configuration rule enables the system to determine one or several other additional output values that are used in the determination of the specific configuration of the complex product. The output values generated by a solver and/or a configuration rule might be further used by the system as input configuration parameters, together or not with additional input configuration parameters, when executing another solver and/or another configuration rule involved in the determination of the specific configuration of the complex product.

At step 205, the system determines the set of output configuration values from the value(s) outputted by the solver(s) and/or configuration rule(s). The output configuration values typically define the specific configuration of the product according to predefined requirements which have been provided to the system, for instance as input configuration parameters. For instance, the system may use some or all the input configuration parameters together with values outputted by one or several solvers for calculating a specific shape of a product, or a dimension, or determine a material to be used, or a thickness of a wall, or a spatial repartition of welding points, etc.

At step 206 and optionally, the system according to the invention automatically transmits the output configuration values to a manufacturing system comprising manufacturing machines configured for manufacturing the product according to said output configuration values. For instance, all or part of the output configuration values might be used for controlling the manufacturing machines involved in the technical manufacture of the product, wherein the use of said output configuration values result in a product characterized by said specific configuration, said output configuration values enabling for in stance a specific control of a motion of a manufacturing tool of a manufacturing machine.

Compared to existing solutions, the present invention presents the following advantages:

- it enables a user to choose the order in which input configuration parameters have to be set in a complex ETO task. Additionally, the training of the DNN by the training system according to the invention is separated from the configuration process handled by the system according to the invention, and therefore the training can take place long before starting any configuration process and can easily be done in a massive parallelism. Compared to all state-of-the-art approaches that execute the external code/simulators during the configuration process, the use of a DNN speeds up the configuration process by orders of magnitude: No external tools need ever be executed during a configuration;
- it proposes a use of DNNs with rectified linear units to obtain a good approximation of the ECT by training, making the resulting DNN fall into the class of piecewise linear functions, which can efficiently be analyzed using decision procedures (e.g. SMT solvers, MILP solvers, CPLEX, or δ-decision procedures like dReal).

The invention claimed is:

1. A method for determining a set of output configuration values characterizing a specific configuration of a complex product, the method comprising:

a) receiving a set of input configuration parameters that is orderless;

b) providing at least a part of the input configuration parameters as an input to a solver;

c) using the solver to calculate at least one output value from the provided input configuration parameters;

d) determining the set of output configuration values at least from the at least one output value calculated by the solver; and e) using the solver for solving a first order logic function encoding an algorithm of a trained deep neural network, the algorithm of the deep neural network having been trained for modeling a function of an external configuration tool required for determining the specific configuration of the complex product;

f) the first order logic function, which encodes the algorithm of the trained deep neural network, enabling the solver to solve the first order logic function with the at least a part of the set of input configuration parameters being orderless;

g) using the system to receive as an input from a user the output configuration values required to be reached or satisfied by the complex product once the specific configuration of the complex product is achieved, and using the system to automatically determine constraints or requirements on the input configuration parameters from the output configuration values.

2. The method according to claim 1, which further comprises using the at least one output value as an input to another solver configured for solving another first order logic function encoding an algorithm of another deep neural network, the other deep neural network having been trained for approximating another function of the external configuration tool or a function of another external configuration tool.

3. The method according to claim 1, which further comprises automatically transmitting the output configuration values to a manufacturing system configured for controlling manufacturing processes according to the output configuration values.

4. The method according to claim 1, which further comprises providing the deep neural network with a rectified linear unit as an activation function.

5. A method for training a deep neural network to approximate a function of an external configuration tool, the method comprising:

receiving sets of input parameters, each set of input parameters including all parameters needed by a first order logic function of the external configuration tool for calculating an associated set of one or several external configuration tool output values involved in a determination of a specific product configuration of a complex product;

receiving for each set of input parameters the associated set of one or several external configuration tool output values, the one or several external configuration tool output values having been obtained by running the function of the external configuration tool when using it as an input of a latter of the set of input parameters to which the one or several external configuration tool output values are associated;

training an algorithm of the deep neural network approximating the external configuration tool, the training being based on pair of sets including each one of the sets of input parameters and its associated set of output values; and storing the trained deep neural network;

the trained deep neural network having an algorithm encoded by a first order logic function enabling the first order logic function to be solved by a solver provided with, as input, at least a part of a set of input configuration being orderless;

during data collection implemented by the training, using the external configuration tool to calculate for each set of the input parameters the associated set of the external configuration tool output values being automatically collected by the training and stored in a memory.

6. A system for determining a set of output configuration values characterizing a specific configuration of a complex product, the system comprising:

a first interface for acquiring a set of input configuration parameters that is orderless;

a computation unit including a solver provided with input being at least a part of the set of input configuration parameters that is orderless; and a second interface for providing output configuration values generated by said computation unit;

said solver configured for solving a first order logic function encoding an algorithm of a trained deep neural network, the algorithm of the deep neural network having been trained for modeling a function of an external configuration tool required for determining the specific configuration of the complex product;

the first order logic function, which encodes the algorithm of the trained deep neural network, enabling the solver to solve the first order logic function with the at least a part of the set of input configuration parameters being orderless;

the system configured to receive as an input from a user the output configuration values required to be reached or satisfied by the complex product once the specific configuration of the complex product is achieved, and the system configured to automatically determine constraints or requirements on the input configuration parameters from the output configuration values.

7. The system according to claim 6, which further comprises a manufacturing system including manufacturing machines configured for automatically controlling manufacturing processes according to the output configuration values to thereby obtain the complex product with the specific configuration characterized by the output configuration values, wherein said manufacturing machines include at least one manufacturing machine having a manufacturing tool configured for motion controlled by the output configuration values.

8. A training system configured for training a deep neural network to approximate a function of an external configuration tool, the training system comprising:

a first training interface configured for acquiring sets of input parameters;

a second training interface configured for receiving, for each set of input parameters, an associated set of external configuration tool output values generated by executing the function of the external configuration tool;

a training computation unit configured for training the deep neural network based on each pair of sets including a set of input parameters and its associated set of external configuration tool output values, said training computation unit configured for controlling the external configuration tool to cause the external configuration tool to provide for each set of input parameters the set of external configuration tool output values, the set of external configuration tool output values being collected by said training computation unit through said second training interface in order to train the deep neural network; and a memory configured for storing the trained deep neural network;

the trained deep neural network having an algorithm encoded by a first order logic function enabling the first order logic function to be solved by a solver provided with, as input, at least a part of a set of input configuration parameters being orderless;

during data collection implemented by the training system, the external configuration tool calculating for each set of the input parameters the associated set of the external configuration tool output values being automatically collected by the training system and stored in the memory.

* * * * *